United States Patent [19]

Usuki et al.

[11] Patent Number: 5,432,241

[45] Date of Patent: * Jul. 11, 1995

[54] PROCESS TO PREVENT POLYMER SCALE ADHESION USING AN AROMATIC COMPOUND AND A SALT OF POLYVINYLSULFURIC ACID

[75] Inventors: Masahiro Usuki; Mikio Watanabe, both of Kamisu; Susumu Ueno, Hazaki, all of Japan

[73] Assignee: Shin-Etsu Chemical Co., Ltd., Tokyo, Japan

[*] Notice: The portion of the term of this patent subsequent to Jul. 4, 2012 has been disclaimed.

[21] Appl. No.: 261,296

[22] Filed: Jun. 16, 1994

Related U.S. Application Data

[62] Division of Ser. No. 729,639, Jul. 15, 1991, abandoned.

[30] Foreign Application Priority Data

Jul. 16, 1990 [JP] Japan .................................. 2-187530

[51] Int. Cl.$^6$ ............................................... C08F 2/00
[52] U.S. Cl. ......................................... 526/62; 526/74
[58] Field of Search .................................. 526/62, 74

[56] References Cited

U.S. PATENT DOCUMENTS

| | | | |
|---|---|---|---|
| 3,954,666 | 5/1976 | Marquisee et al. | 428/402 |
| 4,758,639 | 7/1988 | Koyanagi et al. | 526/62 |
| 5,030,762 | 7/1991 | Brake | 564/508 |

FOREIGN PATENT DOCUMENTS

| | | |
|---|---|---|
| 96319 | 12/1983 | European Pat. Off. . |
| 1222595 | 2/1971 | United Kingdom . |

Primary Examiner—Joseph L. Schofer
Assistant Examiner—Tom Weber
Attorney, Agent, or Firm—Oblon, Spivak, McClelland, Maier & Neustadt

[57] ABSTRACT

A process to prevent scale adhesion on rector surfaces when polymerizing vinyl esters, vinyl esthers, carboxylic acids, styrene or diene monomers. Coating of internal reactor surfaces with a combination of an amino containing aromatic compound, and an alkali metal or ammonium salt of polyvinylsulfuric acid results in the scale prevention. This combination is applied to reactor surfaces via its mixture with a solvent and is subsequently dried to form the coating.

15 Claims, No Drawings

PROCESS TO PREVENT POLYMER SCALE ADHESION USING AN AROMATIC COMPOUND AND A SALT OF POLYVINYLSULFURIC ACID

This application is a division of application Ser. No. 07/729,639, filed on Jul. 15, 1991, now abandoned.

BACKGROUND OF THE INVENTION

1. Field of the Invention

The present invention relates to a polymer scale preventive agent and a method of preventing polymer scale deposition using it for polymerization of a particular polymerizable monomer having an ethylenic double bond.

2. Description of Prior Art

In processes of preparing polymers by polymerizing a monomer in a polymerization vessel, the problem that polymers deposit on the inner wall surface and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer, there is a danger that the operators may be exposed to the unreacted monomer, which may cause some physical disorders.

Heretofore, there are known methods for preventing polymer scale deposition in which the inner wall and so forth are coated with a suitable substance as a polymer scale preventive agent. Such substances suited as polymer preventive agents include, for example, particular polar compounds (Japanese Patent Publication (KOKOKU) No. 45-30343(1970)); dyes or pigments (Japanese Patent Publication (KOKOKU) Nos. 45-30835(1970) and 52-24953(1977); aromatic amine compound (Japanese Pre-examination Patent Publication (KOKAI) No. 51-50887(1976)); a reaction product of a phenolic compound with an aromatic aldehyde (Japanese Pre-examination Patent Publication (KOKAI) No. 55-54317(1980)).

These methods are effective in preventing polymer scale deposition, in the case where the monomer to be polymerized is a vinyl halide such as vinyl chloride or a monomer mixture containing largely a vinyl halide. However, in the case where the monomer having an ethylenic double bond to be polymerized is a monomer having the general formula:

$$CH_2=CXY$$

wherein X is a hydrogen atom or the methyl group; Y is a hydrogen atom, an alkyl group or a group represented by the formula: —COOH, —COOM (where M is an alkali metal or an ammonium ion), —COOR, —OCOR, —OR (where in the formulas R is an alkyl group), —CN, —C$_6$H$_5$, —C$_6$H$_4$Z (where Z is an hydrogen atom, —OH, —CH$_3$ or —CH=CH$_2$), or —CH=CH$_2$, including styrene, α-methylstyrene, acrylates and acrylonitrile, which have a high dissolving power against the coatings formed by the above prior art methods, the coatings may be partly or completely dissolved away. Consequently, it becomes impossible to prevent the deposition of polymer scale effectively.

Particularly, among the monomers, styrene, α-methylstyrene, acrylates and acrylonitrile have extremely strong dissolving power; therefore effects of preventing polymer scale can not be attained as desired. Besides, particularly where a polymerization vessel made of stainless steel is used, polymer scale is liable to deposit on the inner wall surfaces of the polymerization vessel as compared with the case where polymerization vessels whose inner walls are lined with glass.

SUMMARY OF THE INVENTION

Accordingly, it is an object of the present invention to provide a polymer scale preventive agent and a method capable of effectively preventing polymer scale deposition on the inner wall of a polymerization vessel in the polymerization or copolymerization of the monomer of the general formula (I) having a strong dissolving power.

According to the present invention, as a means of achieving the object above, there is provided a polymer scale preventive agent for use in a polymerization vessel in polymerization of a polymerizable monomer having the general formula (I):

$$CH_2=CXY \qquad (I)$$

wherein X is a hydrogen atom or the methyl group; Y is a hydrogen atom, an alkyl group (normally, an alkyl group having 1 to 4 carbon atoms such as methyl, ethyl, propyl and butyl) or a group represented by the formula: —COOH, —COOM (where M is an alkali metal such as K, Na or Li or an ammonium ion), —COOR, —OCOR, —OR (where in the formulas R is an alkyl group, normally, an alkyl group having 1 to 4 carbon atoms), —CN, —C$_6$H$_5$, —C$_6$H$_4$Z (where Z is an hydrogen atom, —OH, —CH$_3$ or —CH=CH$_2$), or —CH=CH$_2$, said agent comprising:

(A) an aromatic compound having at least one group selected from the class consisting of primary, secondary and tertiary amino groups and the quaternary ammonium group and/or a dye having at least one group selected from said class, and (B) at least one compound selected from the group consisting of alkali metal salts and ammonium salts of a polyvinylsulfuric acid.

According to the present invention, there is also provided a method of preventing polymer scale deposition in a polymerization vessel in polymerization of a polymeriable monomer having the general formula (I), wherein said polymerization is carried out in a polymerization vessel having a coating, on its inner wall surfaces, comprising:

(A) an aromatic compound having at least one group selected from the class consisting of primary, secondary and tertiary amino groups and the quaternary ammonium group and/or a dye having at least one group selected from said class, and (B) at least one compound selected from the group consisting of alkali metal salts and ammonium salts of a polyvinylsulfuric acid.

The present invention also provides a polymerization vessel having the coating formed as set out above on the inner wall.

According to the present invention, polymer scale deposition can be effectively prevented even in the polymerization copolymerization or of monomers having said general formula (I) in which effective prevention of polymer scale deposition has been so far difficult due to the high dissolving power of the monomer against the conventional scale preventive coatings. Particularly, even in polymerizing monomers such as styrene, α-styrene, acrylic acid, acrylates, vinyl acetate and acrylonitrile, polymer scale deposition can be prevented.

This prevention is effective independent of materials of the inner wall; in the polymerization in a stainless steel polymerization vessel, polymer deposition can be effectively prevented.

DETAILED DESCRIPTION OF PREFERRED EMBODIMENTS

(A) Aromatic Compound and/or Dye.

Component (A) of the polymer scale preventive agent is an aromatic compound having at least one group selected from the class consisting of primary, secondary and tertiary amino groups and the quaternary ammonium group and/or a dye having at least one group selected from said class.

The aromatic compound having said group includes, for example, aromatic amines such as diaminodiphenylamine, ethylenedianiline, diaminonaphthalene and like, acridines such as acridine, diaminoacridine and the like, phenazines such as phenazine, aminophenazines and the like, azobenzenes such as aminoazobenzenes, hydroxyazobenzenes and the like, hydrochlorides and sulfates thereof, and alkaloids such as berberine hydrochloride.

The dye having said group includes, for example, C.I. Solvent Yellow 2, 4, 5, 6, 14, 15, 16, 19, 21, 33, 56, 61 and 80; C.I. Solvent Orange 1, 2, 14, 37, 40, 44 and 45; C.I. Solvent Red 1, 3, 8, 23, 24, 25, 27, 30, 49, 81, 82, 83, 84, 100 and 121;C.I. Solvent Brown 3, 5, 20 and 37; C.I. Solvent Black 3, 5, 7, 22 and 23; C.I. Acid Black 123; C.I. Disperse Yellow 1, 3, 4, 5, 7, 31, 33, 49, 50, 60, 61, 64, 66, 71, 72, 76, 78 and 79; C.I. Disperse Orange 1, 3, 5, 11, 13, 20, 21, 30, 32, 41, 43, 45, 46, 49, 50 and 51; C.I. Disperse Red 1, 4, 5, 7, 11, 12, 13, 15, 17, 43, 52, 53, 54, 55, 56, 58, 59, 60, 65, 72, 73, 74, 75, 76, 80, 82, 84, 88, 90, 91, 92, 97, 99, 101, 103, 113, 116, 117, 122, 125, 126, 127, 128 and 129; C.I. Disperse Violet 1, 4, 8, 10, 18, 23, 24, 26, 28, 30, 33, 37 and 38; C.I. Disperse Blue 1, 5, 6, 43, 44, 88 and 96; C.I. Disperse Brown 3 and 5; C.I. Disperse Black 1, 2, 10, 26, 27, 28, 29, 30 and 31; C.I. Basic Red 2 and 12; C.I. Basic Blue 1, 6, 7, 9, 12, 16, 24 and 25; C.I. Basic Black 2; C.I. Basic Orange 2, 14 and 15; C.I. Basic Violet 10 and 14; C.I. Basic Yellow 1, 4 and 6; C.I. Basic Green 5 and 12; C.I. Basic Brown 1; and condensation products of an aromatic amine compound with an aromatic nitro compound, e.g., condensation products obtained by condensation of an aromatic amine compound and an aromatic nitro compound in the presence of a mineral acid and a specified condensation catalyst at a temperature of from 100° C. to 250° C., disclosed in U.S. Pat. No. 4,528,336 which is incorporated herein by reference, specifically condensation products obtained by condensation of an aromatic amine compound having the general formula (II):

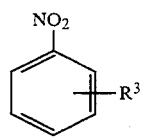
(II)

wherein R¹ is a hydrogen atom, chlorine atom, amino group, phenylazo group —N=N—C₆H₅, hydroxy group, acetyl group, methoxy group, phenylamino group, aminophenylamino group, methoxyphenylamino group, dimethylamino group, hydroxyphenylamino group, acetylamino group or an alkyl group having from 1 to 3 carbon atoms, and R² is a hydrogen atom, amino group, hydroxy group or methyl group, with an aromatic nitro compound having the general formula

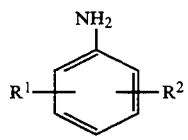
(III)

wherein R³ is a hydrogen atom, chlorine atom, hydroxy group, methoxy group, ethoxy group, amino group, carboxyl group —COOH or sulfo group —SO₂OH, in the presence of a condensation catalyst at a temperature of 100° C. to 250° C. disclosed in said U.S. Patent.[1]

The aromatic compounds and dyes can be used singly or in combination of two or more.

Among them, out of the aromatic compounds, preferred are diaminodiphenylamine, diaminonaphthalenes, diaminoacridines, aminoazobenzenes and berberine hydrochloride, and out of the dyes, preferred are C.I.Solvent Black 3, 5, 7 and 22, C.I.Basic Black 2, C.I.Basic Orange 14, and the condensation products obtained by condensation of an aromatic amine compound having the general formula (II) wherein R¹ is a hydrogen atom, chlorine atom, amino group, phenylamino group or hydroxyphenylamino group and R² is a hydrogen atom, amino group, hydroxy group or methyl group, with an aromatic nitro compound having the general formula (III) wherein R³ is a hydrogen atom, chlorine atom, hydroxy group, methoxy group, ethoxy group, amino group, amino group or carboxyl group, disclosed in the U.S. Pat. No. 4,528,336. Particularly preferred are C.I.-Solvent Black 3, 5, 7 and 22 and Condensation Products I to XXI disclosed in the U.S. Patent and described in Table 4 later.[2]

(b) Salt of Polyvinylsulfuric Acid

The salt of polyvinylsulfuric acid used as component (B) of the polymer scale preventive agent preferably has a polymerization degree of 500 or more, more preferably from 1,000 to 5,000 because the polymer scale preventing effects are enhanced.

The alkali metal salt or ammonium salt of polyvinylsulfuric acid is, for example, represented by the following structural formula:

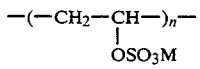

wherein M is an alkali metal such as K, Na or the like or an ammonium ion and n is an integer, and the sulfonation degree is preferably from 90 to 95%.

The polymer scale preventive agent is used for preventing deposition of polymer scale by forming a coating on the inner wall surfaces, etc. of a polymerization vessel.

The polymer scale preventive agent may contain, in addition to components (A) and (B), a solvent, a surface active agent, a water-soluble polymer compound, an organic or inorganic pH adjuster, etc. For forming said coating on the inner wall surfaces, etc. of a polymerization vessel, normally the polymer scale preventive agent is used in the form of a liquid (solution or dispersion), i.e., as a coating liquid.

In the polymer scale preventive agent, the weight ratio of component (A)/component (B) is normally in the range of 0.1/100 to 100/1, preferably 1/100 to 100/10. If the amount of component (B) relative to that of component (A) is outside the range above, improvement in prevention of polymer scale due to the combined use of components (A) and (B) is hardly obtained. If the ratio of component (A)/component (B) is unsuitable, the coating liquid may be unstable and sediment of component (A) may be formed, so that uniform coatings can be formed with difficulty.

Preparation of Coating Liquid

The coating liquid mentioned above is prepared by adding component (A) and component (B) to a suitable solvent. Specifically, for example, to a solution of component (A) in a suitable solvent, component (B) in a solid state or its aqueous solution is added.

The solvent used for preparation of the coating liquid include, for example, water; alcohols such as methanol, ethanol, propanol, 1-butanol, 2-butanol, 2-methyl-1-propanol, 2-methyl-2-propanol, 3-methyl-1butanol, 2-methyl-2-butanol, and 2-pentanol; ketones such as acetone, methyl ethyl ketone, and methyl isobutyl ketone; ethers such as 4-methyl dioxolan, and ethylene glycol diethyl ether; esters such as methyl formate, ethyl formate, methyl acetate, and methyl acetoacetate; furans such as tetrahydrofuran, furfural, fulfuryl alcohol and tetrahydrofurfuryl alcohol; aliphatic hydrocarbons such as n-hexane and n-heptane; aromatic hydrocarbons such as benzene, toluene, and xylene; halogenated hydrocarbons such as chloromethylene, 1-chlorobutane, amyl chloride, dichloroethylene, and 1,1,2-trichloroethane, and aprotic organic solvents such as acetonitrile, formamide, dimethylformamide, dimethyl sulfoxide and N-methylpyrrolidone. These solvents are used singly or as a mixed solvent of two or more.

Among these solvents, particularly preferred are water and alcohols such as methanol and ethanol, and mixed solvents thereof.

The total concentration of component (A) and component (B) is not limited as long as the coating weight after dried described later is attained, but normally from 0.0001 to 5% by weight, preferably from 0.001 to 2% by weight.

The coating liquid preferably contains (C) a water-soluble polymer compound, and more preferably further contains (D) a pH adjuster in such an amount that pH of the liquid may be adjusted to 7 or below, preferably 6 or below, because the polymer scale preventing effects are further improved.

Water-Soluble Polymer Compound

The water-soluble polymeric compound (C) includes, for example, hydroxyl group-containing polymeric compounds, amphoteric polymeric compounds, anionic polymeric compounds, and cationic polymeric compounds.

The hydroxyl group-containing polymeric compound includes, for example, starches and derivatives thereof such as amylose, amylopectin, dextrin, oxidized starch, acetyl starch, nitrostarch, methyl starch, and carboxymethyl starch; hydroxyl group-containing plant mucous polysaccharides such as pectic acid, protopectin, pectinic acid, laminarin, fucoidin, agar, and carrageenan; hydroxyl group-containing animal mucous polysaccharides such as hyaluronic acid, chondroitin sulfuric acid, heparin, keratosulfuric acid, chitin, charonin, and limacoitin sulfuric acid; nucleic acids such as ribonucleic acid and deoxyribonucleic acid; cellulose derivatives such as methyl cellulose, ethyl cellulose, carboxymethyl cellulose, glycol cellulose, benzyl cellulose, cyanoethyl cellulose, cellulose methylene ether, triphenylmethyl cellulose, formyl cellulose, cellulose acetate, cellulose propionate, cellulose butyrate, cellulose acetate propionate, cellulose sulfonate ester, cellulose carbamate ester, nitrocellulose, cellulose phosphate, and cellulose xanthogenate; hemicelluloses such as xylan, mannan, arabogalactan, and araban; lignins such as alcohol lignin, dioxane lignin, phenol lignin, hydrotropic lignin, mercaptolignine, thioglycollic acid lignin, lignin sulfonic acid, alkali lignin, thioalkali lignin, acid lignin, cuproxam lignin, and periodate lignin; phenol-formaldehyde resins, partially saponified polyvinyl alcohols, and polyvinyl alcohols.

The amphoteric polymeric compounds include, for example, glue, gelatin, casein, and albumin.

The anionic polymeric compound includes, for example, anionic polymeric compounds having a carboxyl group or sulfonic acid group in the side chain as exemplified by sulfomethylated compounds of polyacrylamide, polyacrylic acid, alginic acid, an acrylamide/vinylsulfonic acid copolymer, polymethacrylic acid and polystyrenesulfonic acid, and alkali metal salts or ammonium salts of these, and carboxymethyl cellulose.

The cationic polymeric compound includes cationic polymeric electrolytes containing a nitrogen atom, including, for example, polyvinylamines, polyethyleneamines, polyethyleneimines, polyacrylamides, N-vinyl-2-pyrrolidone/acrylamide copolymer, polyvinylpyridines, polyvinylpyrrolidones, polyvinylcarbazoles, polyvinylimidazolines, polydimethylaminoethyl acrylates and polydimethylaminoethyl methacrylates.

These water-soluble polymeric compounds may be used singly or in combination of two or more.

Among these water-soluble polymer compounds (C), preferred are carboxymethyl cellulose, methyl cellulose, polyacrylic acids, polymethacrylic acids and polyvinyl alcohols.

The concentration of component (C) in a coating liquid is preferably in the range of from 0.01 to 5 g/liter, more preferably from 0.01 to 2 g/liter.

(D) pH adjuster

The pH adjuster (D) includes, for example, sulfuric acid, hydrochloric acid, phosphoric acid, nitric acid, carbonic acid, perchloric acid, molybdic acid, tungstic acid, phosphomolybdic acid, phosphotungstic acid, molybdosilicic acid, tungstosilicic acid, formic acid, acetic acid, oxalic acid, lactic acid, maleic acid, glycollic acid, thioglycollic acid, p-toluenesulfonic acid, tannic acid, phytic acid and the acidic salts thereof. These may be used singly or in combination of two or more. Among these, particularly preferred are phosphoric acid, hydrochloric acid, perchloric acid, molybdic acid, tungstic acid, phosphomolybdic acid, phosphotungstic acid, molybdosilicic acid, tungstosilicic acid, p-toluenesulfonic acid, phytic acid and the acidic salts thereof. These pH adjusters are preferably used as an aqueous solution with a suitable concentration when the pH of a coating liquid is adjusted.

Formation of the coating

The polymer scale preventive liquid is applied to the inner walls of a polymerization vessel and then dried sufficiently, followed by washing with water if necessary, to form the coating. The drying may be carried out at a temperature from room temperature to 100° C., for instance.

The polymer scale preventive liquid is preferably applied to not only the inner wall surface of a polymerization vessel but also other parts with which the monomer comes into contact during polymerization to form a coating on such parts. For example, it is preferred to apply the coating solution to a stirring shaft, stirring blades, condensers, headers, search coil, bolts, nuts, etc. to form the coating thereon.

More preferably, for formation of the coating, the polymer scale preventive liquid is applied to portions with which monomers does not come into contact during polymerization but on which polymer scale may deposit, for example, portions of recovery system for unreacted monomer with which unreacted monomer comes into contact, such as inner surfaces, etc. of equipment and pipes of the recovery system. Specifically, such portions include the inner surfaces of monomer distillation columns, condensers, monomer stock tanks and valves.

The method of applying the coating solution is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive liquid, is not limited, either. Following methods can be used. That is, a method in which, after the solution is applied, hot air with an suitable elevated temperature is blown to the coated surface, and a method in which the inner wall surface of a polymerization vessel and the surfaces of other parts to be coated are previously heated to from 30 to 80° C., and the polymer scale preventive liquid is directly applied to the heated inner wall surfaces, etc. After dried, the coated surfaces are washed with water if necessary.

The coating thus obtained normally has a coating weight of preferably 0.001 to 5 g/m$^2$, and more preferably from 0.001 to 3 g/m$^2$.

Polymerization

After the formation of the coating on the inner wall surfaces of a polymerization vessel, and preferably other parts with which monomer may come into contact during polymerization by coating treatment, polymerization is carried out in accordance with conventional procedures. That is, a monomer represented by the general formula (I), a polymerization initiator, and optionally a polymerization medium such as water, etc., and a dispersing agent are charged into the polymerization vessel, followed by carrying out polymerization according to conventional methods.

The monomer to be polymerized according to the present method includes, for example, vinyl esters such as vinyl acetate and vinyl propionate; acrylic acid, methacrylic acid, and esters or salts thereof; diene monomers such as butadiene, chloroprene and isoprene; styrene and α-methylstyrene; and vinyl ethers. These monomers can be used singly or in combination of two or more.

There are no particular limitations on the type of polymerization to which the method of this invention can be applied. The present invention is effective in any type of polymerization such as suspension polymerization, emulsion polymerization, solution polymerization, bulk polymerization, and gas phase polymerization.

In the following, general conditions are described on each type of polymerization.

In the case of suspension or emulsion polymerization, for example, water and a dispersing agent are charged into a polymerization vessel, and thereafter a polymerization initiator and monomers are charged (whereupon the pressure inside the polymerization vessel usually becomes from 0 to 10 kgf/cm$^2$.G). During the polymerization, one or more of water, a dispersing agent and a polymerization initiator may be added, if necessary. The polymerization may be judged to be completed when a desired conversion is reached (normally, a conversion of 80–100% has been reached). The water, dispersing agent and polymerization initiator to be charged for polymerization are used in amounts of about 50 to 500 parts by weight, about 0.01 to 30 parts by weight, and about 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C.

Application of the method of preventing polymer scale deposition of the present invention to polymerization, makes it possible to prevent polymer scale from depositing, independent of materials constituting the inner wall, etc. of a polymerization vessel. For example, this method can prevent deposition of polymer scale even in the case polymerization is carried out in a polymerization vessel made of a steel including stainless steel or a vessel whose inner walls are lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-acumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

The polymerizations to which the polymer scale preventive agent can be suitably applied, include, for example, emulsion polymerizations and suspension polymerizations for production of copolymers of styrene with acrylic acid or its ester, copolymers of styrene with metharylic acid or its ester, polystyrenes, ABS copolymer resins, and synthetic rubbers such as SBR, NBR, CR, IR and IIR.

In the practice of the present method, the coating operation of the coating liquid may be conducted every batch or every some tens of batches. The coating formed has a high durability and maintains the polymer scale preventing action. Therefore, normally, coating treatment may be conducted every several batches, so that the polymerization vessel can be used repeatedly without deposition of polymer scale on the inner wall, etc. of the vessel.

EXAMPLES

The present invention is now described in detail by way of working examples and comparative examples. In each of the tables below, coating liquids or Experiment marked with * indicate comparative examples, and the other Experiment Nos., working examples of the present invention.

EXAMPLE 1

Preparation of coating liquids

Component (A) (the aromatic compound and/or dye) was dissolved or dispersed in a solvent so as to give a concentration of 0.1% by weight. To the resulting mixture, an aqueous solution of potassium polyvinylsulfate with a polymerization degree of 1,500 was added to prepare Coating liquids, provided that in place of potassium polyvinylsulfate, sodium polyvinylsulfate with a polymerization degree of 1,500 was used for Coating Solution No. 23 and ammonium polyvinylsulfate with a polymerization of 1,500 was for Coating Solution No. 24.

In Table 1, in regard to each of the coating liquids, the kind of component (A), the weight ratio of the component (A)/(B), the composition and the weight ratio of water/an organic solvent in the solvent used are given. However, the coating liquids of Nos. 21 and 22 are comparative examples in which no component (B) is contained.

TABLE 1

| No. of coating liquid | (A) Aromatic compound or dye | Wt. ratio (A)/(B) | Solvent Composition | Wt. ratio |
|---|---|---|---|---|
| 1 | p,p'-diaminodiphenylamine | 60/100 | Water/Methanol | 50/50 |
| 2 | Berberine hydrochloride | 60/100 | " | 60/40 |
| 3 | 1,8-diaminonaphthalene | 60/100 | " | 60/40 |
| 4 | 3,6-diaminoacridine | 60/100 | Water/Ethanol | 70/30 |
| 5 | p-aminoazobenzene | 60/100 | " | 40/60 |
| 6 | Condensation product I[(1)] | 40/100 | Water/Methanol | 50/50 |
| 7 | Condensation product IV[(1)] | 40/100 | " | 50/50 |
| 8 | Condensation product XI[(1)] | 40/100 | " | 50/50 |
| 9 | Condensation product XII[(1)] | 40/100 | " | 50/50 |
| 10 | Condensation product XIV[(1)] | 40/100 | " | 50/50 |
| 11 | Condensation product XVII[(1)] | 40/100 | " | 50/50 |
| 12 | C.I. Solvent Black 3 | 50/100 | Water/Ethanol | 50/50 |
| 13 | C.I. Solvent Black 5 | 50/100 | " | 50/50 |
| 14 | C.I. Solvent Black 7 | 50/100 | " | 40/60 |
| 15 | C.I. Solvent Black 22 | 50/100 | Water/Methanol | 60/40 |
| 16 | C.I. Basic Orange 2 | 50/100 | Water/Methanol | 60/40 |
| 17 | C.I. Basic Black 2 | 50/100 | " | 60/40 |
| 18 | C.I. Disperse Yellow 7 | 50/100 | " | 50/50 |
| 19 | C.I. Disperse Orange 3 | 50/100 | " | 60/40 |
| 20 | C.I. Basic Brown 1 | 50/100 | " | 50/50 |
| 21* | Condensation product I[(1)] | 100/0 | Methanol | — |
| 22* | Condensation product XVII[(1)] | 100/0 | " | — |
| 23 | Condensation product I[(1)] | 40/100 | Water/Methanol | 50/50 |
| 24 | Condensation product I[(1)] | 40/100 | " | 50/50 |

Remarks:
(1) The condensation products are disclosed in U.S. Pat. No. 4,528,336 and described in Table 4 later.

EXAMPLE 2

In each experiment, polymerization was carried out in the following manner using a stainless steel polymerization vessel with an inner capacity of 20 liters and equipped with a stirrer.

In Experiment No. 102 to 127, a coating liquid indicated in Table 2, which was prepared in Example 1, was applied to the inner wall surfaces, stirring shaft, stirring blades, baffles and other parts with which monomers come into contact during polymerization, and then dried at 50° C. for 15 minutes by heating and washed with water to form a coating. The coating thus formed had a coating weight of 0.1 g/m² after dried.

In the experiments coating solutions were applied as below.

Experiment No. 101: No coating was formed.
Experiment Nos. 102–119: The coating liquids were used as they were prepared in Example 1.

Experiment Nos. 120-127: To the coating liquids indicated in Table 2 as prepared in Example 1, a component (C) (water soluble polymer compound) and a component (D) (pH adjuster) were added, and resulting liquids were used for application.

Among the experiments above, experiments of Nos. 101-103 are comparative examples.

In Table 2, No. of the coating liquid, the kind and concentration of component (C), the kind of component (D), and the pH of the coating liquid in each experiment are given.

In the polymerization vessel in which coating was so formed, were charged 8 kg of water, 5.2 kg of styrene, 2.8 kg of methacrylic acid, 8 g of a partially saponified polyacrylamide and 24 g of α,α'-azobisisobutylonitrile. Polymerization was then carried out with stirring at 90° C. for 5 hours. After the completion of polymerization, the amount of polymer scale deposition on the inner wall surfaces was measured. The results are given in Table 2.

In the experiments, the coating liquids were used as below.

Experiment No. 201: No coating was formed.

Experiment Nos. 202-207: The coating liquids indicated in Table 3 were used as they were prepared in Example 1.

Experiment Nos. 208-225: To the coating liquids indicated in Table 3 as prepared in Example 1, a component (C) (water soluble polymer compound) and a component (D) (pH adjuster) were added, and resulting liquids were used for application.

Among the experiments above, Experiment Nos. 201-203 are comparative examples.

In Table 3, No. of the coating liquid, the kind and concentration of component (C), the kind of component (D), and the pH of the coating liquid in each experiment are given.

In the polymerization vessel in which a coating was so formed, were charged 4 kg of styrene, 2.7 kg of acrylonitrile, 7 kg of water, 135 g of hydroxyapatite, 2.7

TABLE 2

| Exp. No. | No. | (C) Water-soluble polymer compound | (C) Concentration (g/l) | (D) pH adjuster | pH | Amount of polymer scale (g/m$^2$) |
|---|---|---|---|---|---|---|
| 101* | — | — | — | — | — | 1200 |
| 102* | 21* | — | — | — | 3 | 250 |
| 103* | 22* | — | — | — | 3 | 300 |
| 104 | 6 | — | — | — | 5 | 12 |
| 105 | 11 | — | — | — | 5 | 15 |
| 106 | 8 | — | — | — | 5 | 10 |
| 107 | 10 | — | — | — | 5 | 8 |
| 108 | 1 | — | — | — | 7 | 25 |
| 109 | 2 | — | — | — | 7 | 18 |
| 110 | 3 | — | — | — | 7 | 20 |
| 111 | 4 | — | — | — | 9 | 16 |
| 112 | 5 | — | — | — | 7 | 26 |
| 113 | 12 | — | — | — | 7 | 18 |
| 114 | 15 | — | — | — | 5 | 20 |
| 115 | 16 | — | — | — | 4 | 36 |
| 116 | 17 | — | — | — | 3 | 27 |
| 117 | 18 | — | — | — | 7 | 30 |
| 118 | 19 | — | — | — | 7 | 21 |
| 119 | 20 | — | — | — | 4 | 25 |
| 120 | 3 | Carboxymethylcellulose | 0.5 | Perchloric acid | 5 | 10 |
| 121 | 4 | Polyacrylic acid | 0.2 | Phosphoric acid | 5 | 2 |
| 122 | 6 | Polymethacrylic acid | 0.1 | Phytic acid | 4 | 2 |
| 123 | 11 | Methylcellulose | 0.5 | p-toluenesulfonic acid | 4 | 6 |
| 124 | 15 | Polymethacrylic acid | 0.5 | Sulfuric acid | 4 | 5 |
| 125 | 20 | PVA | 0.2 | Tungstic acid | 3 | 2 |
| 126 | 6 | " | 0.1 | Phosphoric acid | 2 | 1 |
| 127 | 10 | " | 0.1 | Phytic acid | 2 | 2 |
| 128 | 23 | " | 0.1 | Phytic acid | 3 | 4 |
| 129 | 24 | " | 0.1 | Phosphoric acid | 3 | 2 |

Remarks:
PVA represents polyvinyl alcohol.

EXAMPLE 3

In each experiment, a coating was formed inside a polymerization vessel having an inner capacity of 20 liters and equipped with a stirrer by conducting the operations of applying a coating liquid, drying and washing with water in the same manner as in Example 2. The coating thus formed had a coating weight of 0.1 g/m$^2$ after dried.

g of lauroyl peroxide, 20 g of t-dodecylmercaptan and 27 g of lauroyl peroxide. Polymerization was then carried out with stirring at 70° C. for 1 hour. Thereafter, the temperature was raised from 70° C. to 80° C. over 2 hours, and reaction was carried out at 80° C. for 1 hour to produce a polymer. After the completion of polymerization, the resulting polymer and unreacted monomers were recovered, and the inside of the polymerization vessel was washed with water. The amount of polymer scale deposition was then measured. The results are given in Table 3.

TABLE 3

| Exp. No. | No. | (C) Water-soluble polymer compound | (C) Concentration (g/l) | (D) pH adjuster | pH | Amount of polymer scale (g/m²) |
|---|---|---|---|---|---|---|
| 201* | — | — | — | — | — | 650 |
| 202* | 21* | — | — | — | 3 | 300 |
| 203* | 22* | — | — | — | 3 | 350 |
| 204 | 6 | — | — | — | 5 | 56 |
| 205 | 11 | — | — | — | 5 | 65 |
| 206 | 7 | — | — | — | 5 | 49 |
| 207 | 9 | — | — | — | 5 | 40 |
| 208 | 10 | Methylcellulose | 0.5 | — | 5 | 35 |
| 209 | 10 | — | — | Phytic acid | 3 | 32 |
| 210 | 10 | Polymethacrylic acid | 0.3 | Phosphoric acid | 4 | 5 |
| 211 | 10 | Benzylcellulose | 0.5 | p-tolunesulfonic acid | 3 | 8 |
| 212 | 13 | Amylose | 0.5 | Acetic acid | 2 | 15 |
| 213 | 13 | PVA | 0.1 | Phosphoric acid | 2 | 6 |
| 214 | 13 | Carboxymethylcellulose | 1.0 | Maleic acid | 3 | 9 |
| 215 | 2 | PVA | 0.7 | Phytic acid | 6 | 2 |
| 216 | 2 | Polyacrylic acid | 0.2 | p-tolunesulfonic acid | 6 | 12 |
| 217 | 3 | " | 0.1 | Tungstic acid | 6 | 12 |
| 218 | 4 | Gelatin | 1.0 | Sulfuric acid | 5 | 29 |
| 219 | 4 | PVA | 0.3 | Phytic acid | 5 | 3 |
| 220 | 16 | Methylcellulose | 0.5 | Lactic acid | 3 | 24 |
| 221 | 17 | Polyacrylic acid | 0.5 | Perchloric acid | 2 | 10 |
| 222 | 18 | Carboxymethylcellulose | 0.8 | Phytic acid | 6 | 18 |
| 223 | 19 | PVA | 0.2 | Molybdosilisic acid | 6 | 5 |
| 224 | 20 | Polymethacrylic acid | 0.2 | Phosphoric acid | 3 | 13 |
| 225 | 20 | Polystyrenesulfonic acid | 1.0 | " | 3 | 20 |
| 226 | 23 | Polyacrylic acid | 1.0 | Phosphoric acid | 6 | 1 |
| 227 | 24 | PVA | 1.0 | Phytic acid | 6 | 2 |

Remarks:
PVA represents polyvinyl alcohol.

Remarks (1) In U.S. Pat. No. 4,528,336, reactants and reaction conditions are as below.

Examples of the aromatic amino compound include: aniline, 1,2-, 1,3-, and 1,4-phenylenediamines, 2-, 3- and 4-aminophenols, 2-, 3- and 4-chloroanilines, 4-aminoazobenzene, 2,4-diaminoazobenzene, 4-aminoacetanilide, 2-, 3- and 4-methylanilines, 4-aminodiphenylamine, 2-aminodiphenylamine, 4,4'-diaminodiphenylamine, N,N-dimethyl-1,4-phenylenediamine, 4-amino-3'-methoxydiphenylamine, 4-amino-4'-hydroxydiphenylamine, 4-chloro-1,2-phenylenediamine, 4-methoxy-1,2-phenylenediamine, 2-amino-4-chlorophenol, 2,3-diaminotoluene and the like, among which particularly preferred are aniline. 1,2-, 1,3- and 1,4-phenylenediamines, 2-, 3- and 4-aminophenols, 4-aminodiphenylamine and 4,4'-diaminodiphenylamine.

Examples of the aromatic nitro compound include: nitrobenzene, 2-, 3- and 4-nitrophenols, 2-, 3- and 4-nitroanisoles, 2-, 3- and 4-nitrophenetoles, 2-, 3- and 4-chloronitrobenzenes, 2-, 3- and 4-nitroanilines, 2-, 3- and 4-nitrobenzoic acids, 2-, 3- and 4-nitrobenzenesulfonic acids and the like, among which particularly preferred are nitrobenzene, 2-, 3- and 4nitrophenols, 2-, 3- and 4-nitrobenzoic acids and 2-, 3- and 4-nitrobenzenesulfonic acids.

The condensation reaction of the above named aromatic amine and nitro compounds is carried out in the presence of a mineral acid and a condensation catalyst.

Suitable mineral acids are hydrochloric acid, sulfuric acid, nitric acid, phosphoric acid and hydrobromic acid, of which the former two are preferred.

The condensation catalyst is preferably an oxidizing compound selected from the class consisting of permanganic acid, permanganates such as potassium permanganate, chromic acid and related compounds such as chromium trioxide, potassium bichromate and sodium chlorochromate, heavy metal nitrates such as silver nitrate and lead nitrate, halogens such as iodine, bromine and chlorine, inorganic and organic peroxides such as hydrogen peroxide, sodium peroxide, dibenzoyl peroxide, potassium persulfate, ammonium persulfate, peracetic acid, cumene hydroperoxide, perbenzoic acid and p-menthane hydroperoxide, oxyacids and salts thereof such as iodic acid, sodium and potassium iodates and sodium and potassium chlorates, metal salts such as iron(III) chloride, copper sulfate, copper(II) chloride and lead acetate, ozone and metal oxides such as copper oxide, mercury oxide, cerium oxide, manganese dioxide and osmic acid. Iron(II) chloride and copper(I) chloride may be used. It is sometimes advantageous that a small amount of iron(II) chloride is used in combination with hydrogen peroxide.

(2) According to U.S. Pat. No. 4,528,336, Condensation product I and XXI were prepared as described below.

A mixture composed of 1.00 mole of aniline, 0.227 mole of nitrobenzene, 0.310 mole of hydrochloric acid in the form of a 35% aqueous solution and 0.103 mole of iron(III) chloride was heated first at 60° C. for 6 hours followed by temperature elevation up to 180° C. to 185° C. where the mixture was kept with agitation for 15 hours with continuous distilling off of water. The aniline and nitrobenzene distilled out as accompanied by the water were returned to the reaction vessel during the reaction. Thereafter, the temperature of the reaction mixture was further increased to 200° C. and agitation was continued at this temperature for further 5 hours to complete the condensation reaction.

The thus formed reaction product in a molten state was poured into a large volume of a diluted hydrochloric acid and heated at 60° C. for 3 hours. The mixture was then filtered while it was still hot to remove the unreacted aniline in the form of the hydrochloride dissolved in the aqueous phase and the filtered cake was washed 5 to 6 times with water to remove the hydrochloric acid followed by drying to give the condensation product. The yield of this product was 45.2% of the total amount of the aniline and nitrobenzene. This product is called the Condensation product I hereinafter.

Condensation Products II to XX were prepared each in a similar manner to the preparation of the Condensation Product I with the formulation as indicated in Table 4 below for the aromatic amine compound, aromatic nitro compound, mineral acid and condensation catalyst as well as the amounts thereof. Table 4 also gives the yields of the respective condensation products calculated on the total amounts by weight of the aromatic amine and nitro compounds.

Further, Condensation Product XXI was prepared in a following manner. Thus, a mixture composed of 1,00 mole of aniline and 0.310 mole of 35% hydrochloric acid was chilled at 10° C or below and, after admixing of 0.103 mole of iron(III) chloride, heated to a temperature of 60° C. where it was agitated for 6 hours to effect the condensation reaction of aniline alone. The temperature of this reaction mixture, without removing the unreacted aniline, was increased to 170° C. to distil out water and, while keeping the mixture at this temperature, 0.227 mole of nitrobenzene was added to the reaction mixture over a period of 6 hours followed by rapid temperature increase up to 180° C. to 185° C. where the reaction was continued for 15 hours. During this reaction period, water formed by the condensation reaction was distilled out together with small volumes of aniline and nitrobenzene and the aniline and nitrobenzene were separated from water and returned to the reaction vessel. Thereafter, the temperature of the reaction mixture was further increased to 200° C. and the reaction was completed by agitating the reaction mixture for additional 5 hours at this temperature.

The thus obtained reaction product in a molten state was poured into a large volume of a diluted hydrochloric acid and heated for 3 hours at 60° C. followed by filtration while the mixture was still hot to remove the unreacted aniline dissolved in the aqueous phase. The filtered cake was washed 6 times with water to remove the hydrochloric acid followed by drying to give the condensation product. The yield of this condensation product was 39.2% based on the total amount of the aniline and nitrobenzene initially used.

TABLE 4

| Condensation Product No. | Aromatic amine compound (moles) | Aromatic nitro compound (moles) | Mineral acid (moles) | Condensation catalyst (moles) | Yield % |
|---|---|---|---|---|---|
| I | Aniline (1.00) | Nitrobenzene (0.227) | Hydrochloric (0.310) | Iron(III) chloride (0.103) | 45.2 |
| II | 4-Methylaniline (1.000) | Nitrobenzene (0.262) | Hydrochloric (0.358) | Ammonium persulfate (0.118) | 40.5 |
| III | Aniline (0.349) + 1,4-phenylenediamine (0.370) | Nitrobenzene (0.407) | Hydrochloric (0.334) | Ammomium persulfate (0.088) | 53.1 |
| IV | 4-Methylaniline (0.630) + 4-aminodiphenylamine (0.370) | Nitrobenzene (0.330) | Hydrochloric (0.452) | Ammomiun persulfate (0.089) | 45.0 |
| V | Aniline (0.664) + 4-aminodiphenylamine (0.336) | Nitrobenzene (0.402) | Hydrochloric (0.297) | Ammomiun persulfate (0.098) | 55.3 |
| VI | Aniline (0.605) + 4-chloro-1,2-phenylenediamine (0.395) | 2-Nitrophenol (0.162) | Hydrochloric (0.270) | Ammomiun persulfate (0.074) | 38.7 |
| VII | Aniline (0.540) + 2-aminophenol (0.460) | 4-Nitrophenol (0.217) | Hydrochloric (0.496) | Ammomiun persulfate (0.044) | 60.2 |
| VIII | Aniline (0.500) + 3-aminophenol (0.500) | 4-Nitrophenetole (0.241) | Hydrochloric (0.496) | Hydrogen peroxide (0.296) + iron(II) chloride (0.004) | 57.1 |
| IX | Aniline (0.809) + 4-aminophenol (0.191) | 2-Nitrophenol (0.116) | Sulfuric (0.498) | Hydrogen peroxide (0.443) + iron(II) chloride (0.006) | 48.9 |
| X | Aniline (1.000) | 2-Aminonitrobenzene (0.222) | Sulfuric (0.462) | 4-menthane hydroperoxide (0.162) | 45.0 |
| XI | Aniline (0.682) + 4-amino-4'-hydroxydiphenlamine (0.318) | 3-Nitroanisole (0.290) | Hydrochloric (0.296) | Sodium iodate (0.118) | 36.7 |
| XII | Aniline (0.607) + 2-amino-4-chlorophenol (0.393) | 2-Chloronitrobenzene (0.215) | Hydrochloric (0.263) | Sodium chlorate (0.239) | 40.5 |
| XIII | Aniline (0.578) + 4-chloroaniline (0.422) | 4-Nitrobenzoic acid (0.148) | Hydrochloric (0.310) | Dibenzoyl peroxide (0.107) | 30.5 |
| XIV | Aniline (0.278) + 4-methylaniline (0.772) | 3-Nitrophenol (0.335) | Hydrochloric (0.298) | Copper(II) chloride (0.126) | 42.0 |
| XV | 4-Aminodiphenylamine (0.370) + 1,3-phenylenediamine (0.630) | 4-Nitrobenzenesulfonic acid (0.243) | Hydrochloric (0.393) | Manganese dioxide (0.330) | 52.1 |
| XVI | 4-Aminodiphenylamine (0.400) + 1,2-phenylenediamine (0.600) | 4-Aminonitrobenzene (0.296) | Hydrochloric (0.393) | Iron(III) chloride (0.096) | 55.3 |
| XVII | Aniline | 4-Chloro- | Hydro- | Ammonium | 47.1 |

TABLE 4-continued

| Condensation Product No. | Aromatic amine compound (moles) | Aromatic nitro compound (moles) | Mineral acid (moles) | Condensation catalyst (moles) | Yield % |
|---|---|---|---|---|---|
| | (0.538) + 1,2-phenylenediamine (0.462) | nitrobenzene (0.203) | chloric (0.286) | persulfate (0.132) | |
| XVIII | Aniline (1.000) | Nitrobenzene (0.227) | Hydrochloric (0.310) | Iron(II) chloride | 40.1 |
| XIX | Aniline (1.000) | Nitrobenzene (0.060) | Hydrochloric (0.310) | Iron (III) chloride (0.103) | 20.1 |
| XX | Aniline (1.000) | Nitrobenzene (0.755) | Hydrochloric (0.310) | Iron (III) chloride (0.103) | 40.1 |

We claim:

1. A method of preventing polymer scale deposition in a polymerization vessel in polymerization of a polymerizable monomer having the formula (I)

$$CH_2=CXY \quad (I)$$

wherein X is a hydrogen atom or a methyl group; Y is a hydrogen atom, an alkyl group or a group represented by the formula: —COOH, —COOM (where M is an alkali metal or an ammonium ion), —COOR, —OCOR, —OR (where in the formulas R is an alkyl group), —CN, —$C_6H_5$, —$C_6H_4Z$ (where Z is an hydrogen atom, —OH, —$CH_3$ or —CH=$CH_2$), wherein said polymerization is carried out in a polymerization vessel having a coating, on its inner wall surfaces, comprising:

(A) an aromatic compound having at least one group selected from the group consisting of primary, secondary and tertiary amino groups, and quaternary ammonium groups; a dye having at least one group selected from the group consisting of primary, secondary and tertiary amino groups, and quaternary ammonium groups; or a mixture thereof, and (B) at least one compound selected from the group consisting of alkali metal salts and ammonium salts of a polyvinylsulfuric acid.

2. The method according to claim 1, wherein the coating has a coating weight of 0.001 to 5 g/m² in the dry state.

3. The method according to claim 1, wherein said coating has been also formed on parts of the polymerization vessel, other than the inner wall surface, with which the monomer comes into contact during polymerization.

4. The method according to claim 1, wherein said coating has been also formed on parts of a recovery system for unreacted monomer with which said unreacted monomer comes into contact.

5. The method according to claim 1, wherein the monomer is at least one member selected from the group consisting of vinyl esters; acrylic acid, methacrylic acid, and esters and salts thereof; diene monomers; styrene, α-methylstyrene, and vinyl ethers.

6. The method according to claim 1, wherein said polymerization is carried out as suspension polymerization, emulsion polymerization, solution polymerization, bulk polymerization or gas phase polymerization.

7. The method according to claim 1, wherein said component (A) is selected from the group consisting of diaminodiphenylamine, diaminonaphthalenes, diaminoacridines, aminoazobenzenes, berberine hydrochloride, C.I. Solvent Black 3, 5, 7 and 22, C.I.Basic Black 2, C.I. Basic Orange 14, and condensation products obtained by condensation of an aromatic amine compound having the formula:

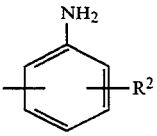

wherein $R^1$ is a hydrogen atom, chlorine atom, amino group, phenylamino group or hydroxyphenylamino group and $R^2$ is a hydrogen atom, amino group, hydroxy group or methyl group, with an aromatic nitro compound having the formula

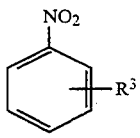

wherein $R^3$ is a hydrogen atom, chlorine atom, hydroxy group, methoxy group, ethoxy group, amino group or carboxyl group, in the presence of a condensation catalyst at a temperature of 100° C. to 250° C.

8. The method according to claim 7 wherein said aromatic amine compound is selected from the group consisting of aniline, phenylene diamine, diphenyl amine and amino phenol, or mixtures thereof; said aromatic nitro compound is selected from the group consisting of nitrobenzene, nitrophenol, nitroanisole and nitrobenzoic acid.

9. The method according to claim 1, wherein a weight ratio of component (A)/component (B) is in the range of 0.1/100 to 100/1.

10. The method according to claim 1, wherein said coating further comprises (C) a water-soluble polymer compound.

11. The method according to claim 10, wherein said water-soluble polymer compound (C) comprises at least one compound selected from the group consisting of carboxymethyl cellulose, methyl cellulose, polyacrylic acids, polymethacrylic acids and polyvinyl alcohols.

12. The method according to claim 1, wherein said coating has been formed by application of a liquid containing components (A) and (B) dissolved or dispersed in at least one solvent selected from the group consisting of water, alcohols, ketones, ethers, esters, furans, aliphatic hydrocarbons, aromatic hydrocarbons, halogenated hydrocarbons, and aprotic organic solvents.

13. The method of claim 12, wherein the liquid has a pH which is adjusted to 7 or less with (D) a pH adjustor.

14. The method of claim 13, wherein the pH adjustor (D) is selected from the group consisting of phosphoric acid, perchloric acid, molybdic acid, tungstic acid, phosphomolybdic acid, phosphotungstic acid, molybdosilicic acid, tungstosilicic acid, p-toluenesulfonic acid, phytic acid and the acidic salts thereof.

15. The method of claim 12, wherein components (A) and (B) are present in said liquid at a total concentration in the range of 0.001 to 5% by weight.

* * * * *